United States Patent [19]

Martin

[11] Patent Number: 5,415,259
[45] Date of Patent: May 16, 1995

[54] FLUID FRICTION CLUTCH WITH LOCKING DEVICE

[75] Inventor: Hans Martin, Stuttgart, Germany

[73] Assignee: Behr GmbH & Co., Stuttgart, Germany

[21] Appl. No.: 145,646

[22] Filed: Nov. 4, 1993

[30] Foreign Application Priority Data

Nov. 26, 1992 [DE] Germany ............... 42 39 720.0

[51] Int. Cl.⁶ .................. F16D 35/00; F16D 47/06
[52] U.S. Cl. .......................... 192/58 R; 192/114 R; 403/56
[58] Field of Search ............ 192/48.5, 58 R, 58 B, 192/57, 114 R; 416/169 A; 123/41.11, 41.12, 41.49, 41.65; 403/53, 56

[56] References Cited

U.S. PATENT DOCUMENTS 4,119,184 10/1978 Mower et al. ............ 192/114 R X
4,320,723 3/1982 Wendling et al. ............ 123/41.12

FOREIGN PATENT DOCUMENTS 3941611 6/1991 Germany.
91 03 493.0 9/1991 Germany.

Primary Examiner—Richard M. Lorence
Attorney, Agent, or Firm—Foley & Lardner

[57] ABSTRACT

A fluid friction clutch includes a driving element and a driven element which is rotatably supported on the driving element and which is entrained by the driving element with fluid friction by a drive disk in a working space. A locking device is disposed between the driving element and the driven element, and includes a coupling rod having first and second ends. First and second joints are provided for rigidly connecting the first and second ends of the coupling rod to the driving element and the driven element, respectively. A balance weight or another coupling rod is arranged diametrically opposite the coupling rod on the driven element.

13 Claims, 3 Drawing Sheets

FLUID FRICTION CLUTCH WITH LOCKING DEVICE

BACKGROUND OF THE INVENTION

The invention relates to a fluid friction clutch having a driving element and a driven element which is rotatably supported on the driving element and which is entrained by the latter with fluid friction by means of a drive disk in a working space, and further having a locking device between the driving element and the driven element, as is known from DE-A 39 41 611.

This known locking device for a fluid friction clutch is relatively complicated from the points of view of manufacture, number of parts and, therefore, economy. The eccentric disks of this locking device, and the engagement surfaces corresponding to it, require certain tolerances in order to fulfil the required function reliably. This relatively high degree of manufacturing complexity is undesirable for such a mass-produced product, which is typically employed as a fan clutch in motor vehicles.

A further locking device is known from DE-U 91 03 493, in which a radial arm manufactured from sheet metal provides the drive for the clutch housing in the locked condition. Although this solution is relatively simple in a structural sense, it is less suitable for continuous operation, particularly in the case of large clutches.

SUMMARY OF THE INVENTION

It is an object of the present invention, therefore, to create a suitable fluid friction clutch locking device which is simple in structural design, reliable in function—even in the case of large forces—and has favorable manufacturing and fitting costs.

In accomplishing this and other objects, there has been provided according to one aspect of the invention a fluid friction clutch having a driving element, and a driven element which is rotatably supported on the driving element and which is entrained by the driving element with fluid friction by a drive disk in a working space. A locking device is disposed between the driving element and the driven element, and includes a coupling rod having first and second ends connected by first and second joint members to the driving element and the driven element, respectively. A balance weight is arranged diametrically opposed to the coupling rod on the driven element.

According to another aspect of the invention, there has been provided a fluid friction clutch having a driving element and a driven element which is rotatably supported on the driving element and which is entrained by the driving element with fluid friction by a drive disk in a working space. A locking device, having coupled and uncoupled positions, is provided, and includes a coupling rod having first and second ends. The first and second ends are attached to the driving element and the driven element, respectively, in the coupled position, and are both attached to the driven element in the uncoupled position. A balance weight is also arranged diametrically opposite the coupling rod on the driven element.

According to yet another aspect of the invention, there has been provided a method for locking a fluid friction clutch, comprising the steps of providing a fluid friction clutch of the type previously described, in addition to a coupling rod having two oppositely disposed eyes. The coupling rod is then positioned so that one of the eyes fits over a trunnion on the driving element and the other of the eyes fits over a trunnion on the driven element. The coupling rod is fastened to the trunnions, thereby effecting direct drive, and a balance weight is attached to the driven element so that it is diametrically opposed to the coupling rod.

Other objects, features and advantages of the present invention will become apparent to those skilled in the art when the preferred embodiments of the invention are more fully described below with reference to the drawings.

BRIEF DESCRIPTION OF THE DRAWINGS

One preferred embodiment of the invention is explained in more detail below with reference to the drawings, which.

DETAILED DESCRIPTION OF THE PREFERRED EMBODIMENTS

The invention achieves advantages by using a so-called coupling rod, which reliably and rigidly connects the driving element and the driven element of the clutch together in the coupled condition so that cooling operation can be maintained. This feature is also advantageous to the extent that it can be retrofitted without great complication on existing clutches, because appropriate holes and threaded trunnions are already present on the clutch, or driven end, as well as on the driving end. The coupling rod itself can be procured cheaply as a simple mass-produced product. The axial offset between the driving element and the driven element can be bridged over simply by the configuration of joints at the ends of the coupling rod and making the length of the coupling rod adjustable—in accordance with preferred further development of the invention—is advantageous.

In accordance with a further advantageous embodiment of the invention, the coupling rod can be fastened to the driven element, i.e., to the rear of the clutch housing, in the uncoupled condition, a balance weight (such as a counterweight or a second coupling rod) being arranged diametrically opposite to it to compensate for the imbalance. When required, i.e., when the driving element and the driven element have to be coupled together, the coupling rod is released at one end and fastened by means of this end to the driving element. The counterweight remains unaltered on the clutch housing, the second coupling rod would be coupled.

Figure 1:
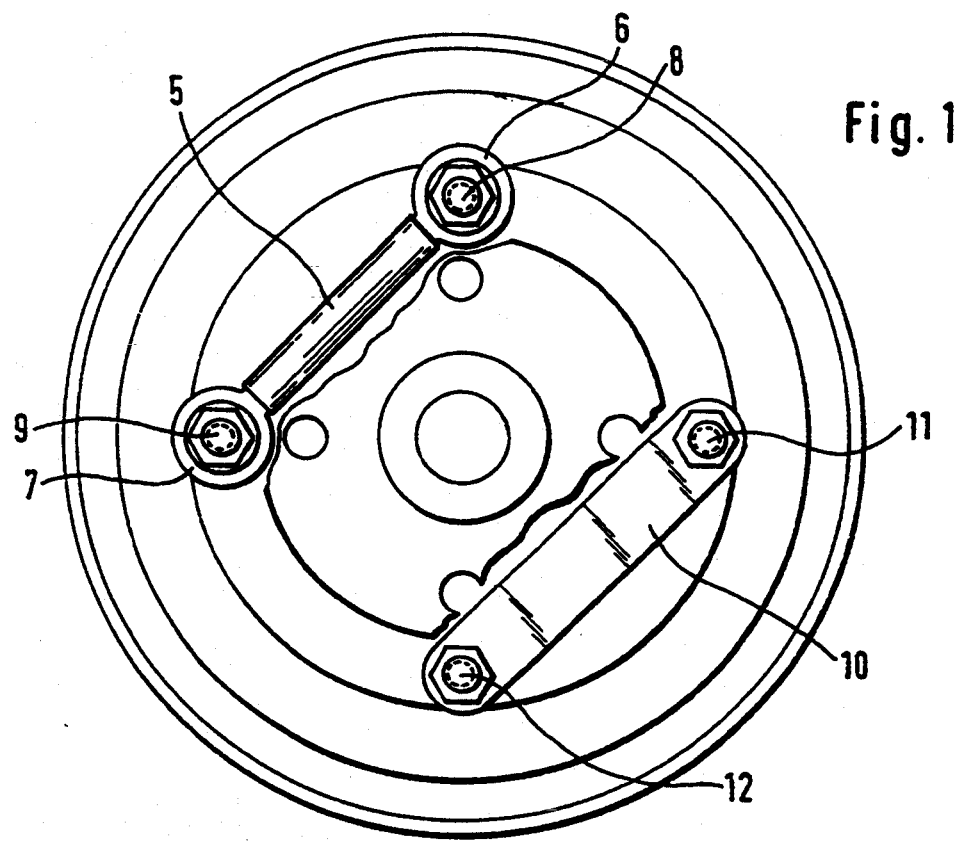
FIG. 1 shows a view of the clutch with locking device in the uncoupled condition.
Figure 2:
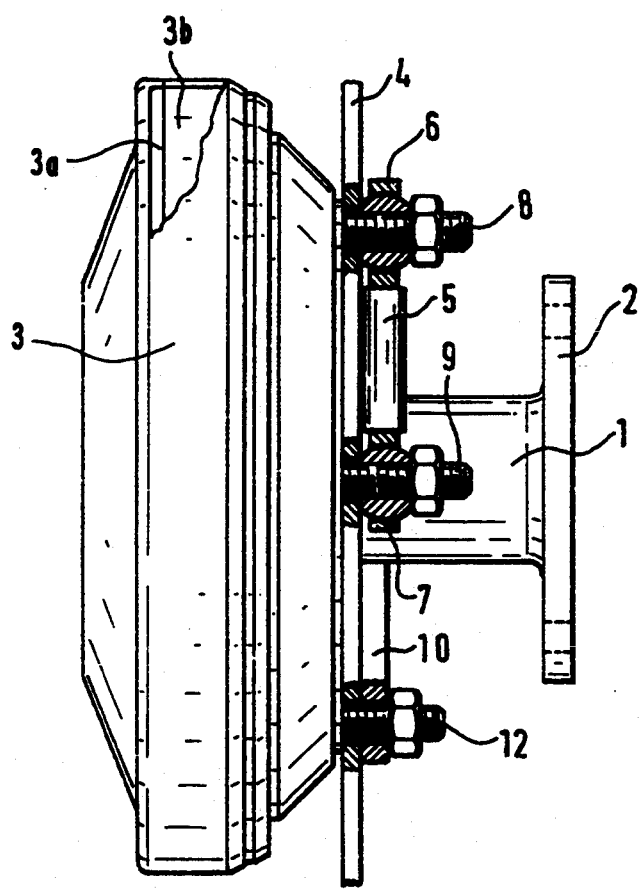
FIG. 2 shows a partial section through the clutch as shown in FIG. 1.
Figure 5:
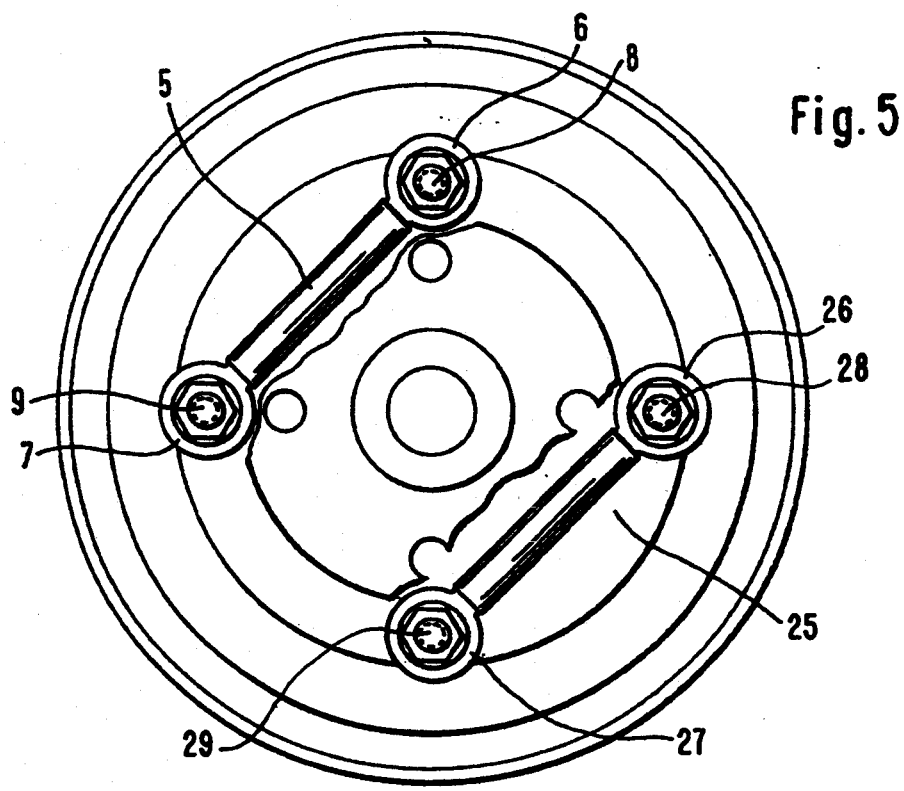
FIG. 5 shows an alternative embodiment of a clutch having two coupling rods.

Turning now to the drawings, FIGS. 1 and 2 show a fluid friction clutch of conventional type whose details are therefore not shown in the drawing but, rather, only the parts necessary for the invention. These are described below. The fluid friction clutch consists, on the one hand, of a driving element 1 in the form of a shaft with a drive flange 2, which shaft is rotatably supported in a clutch housing 3 in a manner not shown and transmits the torque to the clutch housing 3 by means of fluid friction via a drive disk 3a which rotates in a working space 3b within the clutch. Such clutches are preferably employed as fan clutches in motor vehicles—for this reason, the hub 4 of a fan runner is indicated and this hub 4 is fastened to the rear of the clutch housing 3 by means of bolts 8, 9, 11, 12. A coupling rod 5 is fastened by means of its eyes 6 and 7 to these bolts, which are therefore already present on the clutch, when the clutch does not have to be locked, i.e. for normal clutch operation. In order to compensate for the imbalance resulting from the mass of the coupling rod 5, a counterweight 10 is attached diametrically opposite on the bolts 11 and 12. In this way, the coupling rod 5 is attached to the clutch firmly but so that it can be released. If necessary, therefore, it can be released and brought into the locked position. It is also possible to provide a second coupling rod instead of the counterweight 10; such an alternative embodiment is shown in FIG. 5, in which a second coupling rod 25 is used as the balance weight. The second coupling rod 25 is provided with eyes 26 and 27 to fasten it to the clutch housing 3 by bolts 28 and 29.

Figure 3:
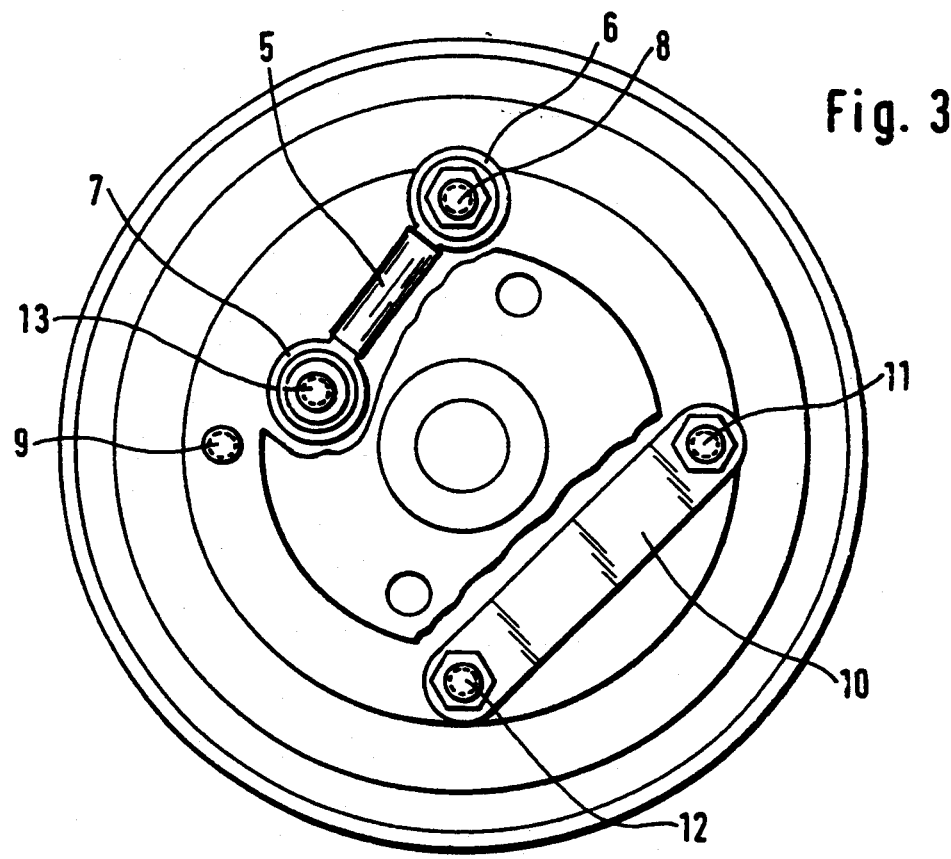
FIG. 3 shows a view of the clutch with locking device in the coupled condition.
Figure 4:
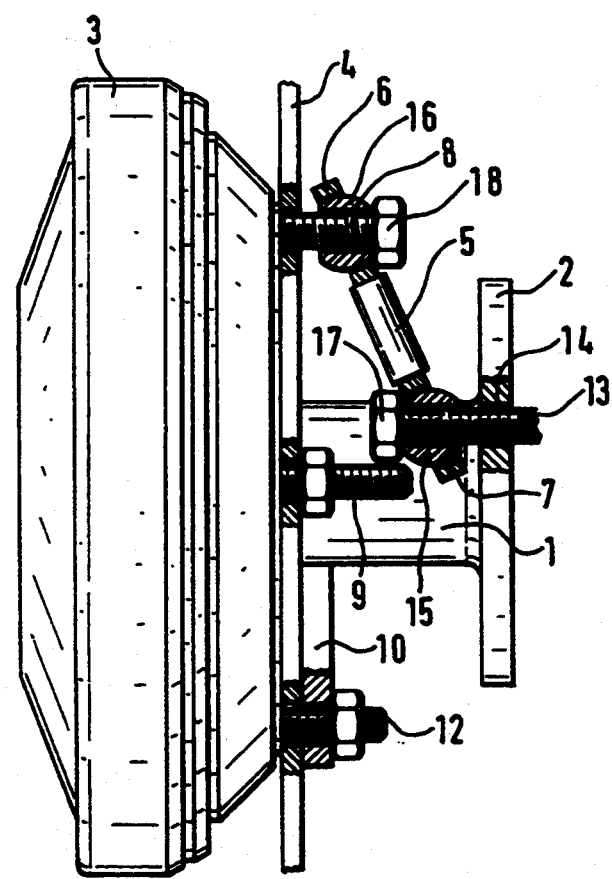
FIG. 4 shows a section through the clutch as shown in FIG. 3.

This locked position is shown in FIGS. 3 and 4, in which the end 7 of the coupling rod 5 is released from the bolt 9 (FIG. 1) and is connected instead to a bolt 13 which is fastened in a hole 14 of the drive flange 2.

The length, i.e. the distance between the fastening holes of the coupling rod 5, can be fixed or adjustable. In the case of a fixed distance, the driving element and the driven element are rotated relative to one another until the correct distance between the two bolts 8 and 13 is found and the coupling rod can be fitted. Because this bolt 13 on the drive flange 2 and the bolt 8 on the rear of the clutch 3 are offset axially relative to one another, the ends of the coupling rod 5 are equipped, in accordance with the invention, with joints in the form of spherical joint bushes 15, 16 which are supported by crowned surfaces in the eyes 6 and 7 of the coupling rod and therefore function as spherical joints. After the spherical joint bushes 15, 16 have been pushed onto the joint trunnions 8 and 13, the joint bushes 15, 16 are secured in an appropriate manner, for example by hexagon nuts 17, 18. A coupling arrangement between the driving element 2 and the driven element 3 is therefore achieved which can be loaded equally in tension and compression and which reliably transmits the necessary torque. Just as at the driven end, where corresponding bolts or trunnions 8, 9, 11, 12 are already present, holes 14 which are already present in the drive flange 2 are used on the drive side for the fastening of the coupling rod. In principle, therefore, no special measures have to be taken on the mass-produced clutch in order to fit the coupling rod in accordance with the invention, i.e. both in the non-coupled and coupled conditions. It is, however, necessary to lengthen the bolts or joint trunnions provided for the fastening of the coupling rod 5 and to match their diameter to the joint bushes.

Figure 6:
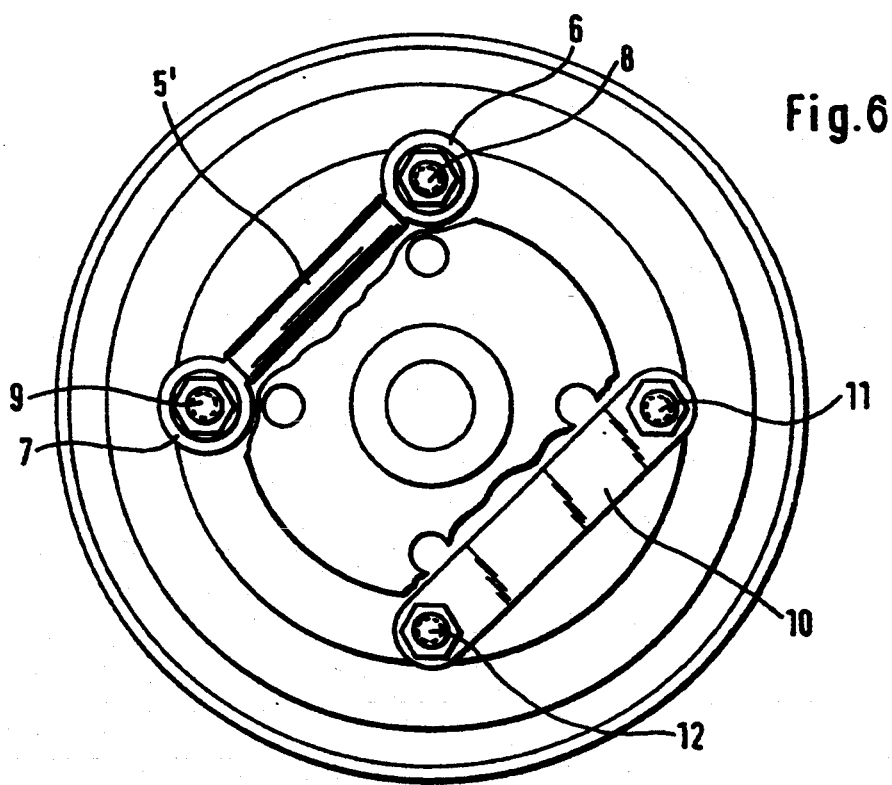
FIG. 6 shows an adjustable length coupling rod.

The coupling rod can also have a variable length as shown in FIG. 6; the adjustable length coupling rod is shown in schematic form as rod 5'. A uniform, "standardized" coupling rod, which fits all clutch types, is however preferred. This can then also be used as the second coupling rod instead of the counterweight or even as a third coupling rod in order to distribute the torque between several coupling rods.

Finally, it should be made clear that the driving and driven ends can also be exchanged in the case of the embodiment example described above, i.e. the clutch would be driven by means of the housing 3 and would drive by means of the flange 2.

In the case where the axial distance between the rear of the clutch 3 and the drive flange 2 is too large, the joints 15, 16 would be deflected too much, i.e. beyond the permissible dimension. This can be avoided by a so-called adapter, which is, for example, configured as a sheet-metal preform and is attached to the rear of the clutch to reduce the distance.

While there has been described and illustrated specific embodiments of the invention, it will be obvious that various changes, modifications and additions can be made herein without departing from the field of the invention which should be limited only by the scope of the appended claims.

What is claimed is:

1. A fluid friction clutch comprising:
   a driving element;
   a driven element which is rotatably supported on said driving element and which is entrained by said driving element with fluid friction by a drive disk in a working space;
   a locking device disposed between said driving element and said driven element, said locking device including a coupling rod having first and second ends connected by first and second joint members to said driving element and said driven element, respectively; and
   a balance weight which is arranged diametrically opposite said coupling rod on said driven element;
   wherein said first and second joint members are circumferentially and axially offset from one another such that said coupling rod is oblique to an axis of rotation of said driving element when said locking device is in a locked position.

2. A fluid friction clutch comprising:
   a driving element;
   a driven element which is rotatably supported on said driving element and which is entrained by said driving element with fluid friction by a drive disk in a working space;
   a locking device disposed between said driving element and said driven element, said locking device including a coupling rod having first and second ends connected by first and second joint members to said driving element and said driven element, respectively; and
   a balance weight which is arranged opposite said coupling rod on said driven element;
   wherein said first and second ends of said coupling rod are each provided with an eye; said first joint member includes a first trunnion, which is rigidly connected to said driving element, and a spherical joint bushing which fits into the eye of said first end of said coupling rod and engages said first trunnion; said second joint member includes a second trunnion, which is rigidly connected to said driven element, and a spherical joint bushing which fits into the eye of said second end of said coupling rod and engages said second trunnion.

3. A fluid friction clutch according to claim 1, wherein said coupling rod is an adjustable length coupling rod.

4. A fluid friction clutch according to claim 2, wherein said driving element has a front surface which faces a rear surface of said driven element, said first trunnion is arranged on said front surface of said driving element and said second trunnion is arranged on said rear surface of said driven element.

5. A fluid friction clutch according to claim 1, wherein said balance weight comprises a second coupling rod.

6. A fluid friction clutch according to claim 2, wherein said trunnions are bolts and said spherical bushings are fastened onto said bolts with nuts for quick assembly and disassembly.

7. A fluid friction clutch comprising:
a driving element;
a driven element which is rotatably supported on said driving element and which is entrained by said driving element with fluid friction by a drive disk in a working space;
a locking device having coupled and uncoupled positions, said locking device comprising a coupling rod having first and second ends, said first and second ends being attached to said driving element and said driven element such that said coupling rod is oblique to an axis of rotation of said driving element, respectively, in said coupled position, and being both attached to said driven element in said uncoupled position; and
a balance weight which is arranged diametrically opposite said coupling rod on said driven element.

8. A fluid friction clutch according to claim 7, wherein said working space is contained in a clutch housing to which clutch housing said driven element is fixed.

9. A fluid friction clutch comprising:
a driving element;
a driven element which is rotatably supported on said driving element and which is entrained by said driving element with fluid friction by a drive disk in a working space;
a locking device having coupled and uncoupled positions, said locking device comprising a coupling rod having first and second ends, said first and second ends being attached to said driving element and said driven element, respectively, in said coupled position, and being both attached to said driven element in said uncoupled position; and
a balance weight which is arranged diametrically opposite said coupling rod on said driven element; said working space is contained in a clutch housing to which clutch housing said driven element is fixed; and
wherein a first plurality of through holes are defined in said driven element, said clutch housing is provided with a plurality of threaded trunnions which protrude from said first plurality of through holes, said driving element includes a flange portion in which a second plurality of through holes are defined, and said coupling rod is attached at said second end to a threaded trunnion protruding from said driven element and at said first end to a threaded trunnion which protrudes from said flange portion of said driving element.

10. A fluid friction clutch according to claim 9, wherein each end of said coupling rod is provided with a spherical bushing for attachment to said threaded trunnions.

11. A method for locking a fluid friction clutch, comprising the steps of:
a) providing a fluid friction clutch having a driving element with at least one trunnion protruding therefrom; a clutch housing which is rotatably supported on said driving element and which is entrained by said driving element with fluid friction by a drive disk disposed within a working space defined in said clutch housing; a driven element which is fixed to said clutch housing and provided with a plurality of through holes; and a plurality of trunnions which are fixed to said clutch housing and which protrude from said plurality of through holes in said driven element;
b) providing a coupling rod having two oppositely disposed eyes;
c) positioning said coupling rod so that one of said eyes fits over a trunnion on said driving element and the other of said eyes fits over a trunnion on said driven element;
d) fastening said coupling rod to said trunnions; and
e) attaching a balance weight to said driven element such that said balance weight is diametrically opposed to said coupling rod.

12. The method of claim 11, wherein the providing step includes providing a coupling rod having two oppositely disposed eyes which are separated by a predetermined distance; and further comprising, after the providing step, the step of rotating said driving element and said driven element relative to one another until the distance between one of said plurality of protruding trunnions on said driven element and said protruding trunnion on said driving element is approximately equal to the distance between said eyes of said coupling rod.

13. The method of claims 11, wherein the providing step includes providing a coupling rod having two oppositely disposed eyes separated by an adjustable distance; and wherein the positioning step includes adjusting the distance between said eyes.

* * * * *